(12) United States Patent
Chen et al.

(10) Patent No.: US 11,048,680 B2
(45) Date of Patent: Jun. 29, 2021

(54) HIVE TABLE SCANNING METHOD, DEVICE, COMPUTER APPARATUS AND STORAGE MEDIUM

(71) Applicant: Ping An Technology (Shenzhen) Co., Ltd., Guangdong (CN)

(72) Inventors: Haitao Chen, Guangdong (CN); Cun Yan, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 437 days.

(21) Appl. No.: 16/097,617

(22) PCT Filed: Feb. 24, 2018

(86) PCT No.: PCT/CN2018/077125
§ 371 (c)(1),
(2) Date: Oct. 30, 2018

(87) PCT Pub. No.: WO2019/136797
PCT Pub. Date: Jul. 18, 2019

(65) Prior Publication Data
US 2019/0332591 A1   Oct. 31, 2019

(30) Foreign Application Priority Data

Jan. 12, 2018 (CN) .......................... 201810030843.4

(51) Int. Cl.
*G06F 16/00* (2019.01)
*G06F 16/22* (2019.01)
*G06F 16/23* (2019.01)
*G06F 16/25* (2019.01)

(52) U.S. Cl.
CPC ...... *G06F 16/2282* (2019.01); *G06F 16/2322* (2019.01); *G06F 16/252* (2019.01)

(58) Field of Classification Search
None
See application file for complete search history.

(56) References Cited

U.S. PATENT DOCUMENTS

2013/0166568 A1*  6/2013  Binkert ................. G06F 16/901
                                                          707/741
2016/0147832 A1*  5/2016  Sankaranarayanan ......................
                                                          G06F 16/2393
                                                          707/717
2018/0096000 A1*  4/2018  Harrison ............... G06F 16/254

* cited by examiner

*Primary Examiner* — Anhtai V Tran

(57) ABSTRACT

The present application discloses a Hive table scanning method, device, computer apparatus and storage medium, wherein the method includes: acquiring an update cycle of a Hive table; determining an update cycle level corresponding to the update cycle; determining a target scanning rule corresponding to the update cycle according to a preset correspondence table between the update cycle level and a preset scanning rule; and performing scan statistics to the Hive table according to the target scanning rule.

17 Claims, 5 Drawing Sheets

HIVE TABLE SCANNING METHOD, DEVICE, COMPUTER APPARATUS AND STORAGE MEDIUM

The present application claims the priority to the Chinese patent application No. CN201810030843.4, filed with the Chinese Patent Office on Jan. 12, 2018 and entitled "hive table scanning method, device, computer apparatus and storage medium", the contents of which are incorporated herein by reference in its entirety.

FIELD OF INVENTION

The present disclosure relates to the technical field of Internet, and more particularly, to a Hive table scanning method, device, computer apparatus and storage medium.

BACKGROUND OF INVENTION

At present, with the development of big data, massive data brings great value, and how to quickly convert redundant big data into usable information is an urgent problem to be solved. Hadoop distributed processing platform becomes the choice for processing big data, wherein, Hive table is a data warehouse tool based on Hadoop, which could map structured data files into a database table and provide simple SQL query function, realizing storage and management for big data. However, with the increase of the amount of data, the magnitude order of a Hive table is usually 100 million or more than one billion, and if scan these Hive tables, it will take about 200 hosts and at least one day to complete the scan statistics, which seriously drags down the efficiency of machine learning, therefore, a Hive table scanning method is required to solve the above problem.

SUMMARY OF THE INVENTION

The present disclosure provides a Hive table scanning method, device, computer apparatus and storage medium, which aims to improve the scan statistics rate of the Hive table and improve the efficiency of machine learning.

In a first aspect, the present disclosure provides a Hive table scanning method, including: acquiring update time information of a Hive table, wherein the update time information includes an update cycle of the Hive table; determining an update cycle level corresponding to the update cycle according to a preset correspondence rule; determining a target scanning rule corresponding to the update cycle according to a preset correspondence table between the update cycle level and a preset scanning rule; and performing scan statistics to the Hive table according to the target scanning rule.

In a second aspect, the present disclosure provides a Hive scanning device, including: a time acquiring unit, for acquiring update time information of the Hive table, wherein the update time information includes an update cycle of the Hive table; a level determining unit, for determining an update cycle level corresponding to the update cycle according to a preset correspondence rule; a rule determining unit, for determining a target scanning rule corresponding to the update cycle according to a preset correspondence table between the update cycle level and a preset scanning rule; and a scan statistics unit, for performing scan statistics to the Hive table according to the target scanning rule.

In a third aspect, the present disclosure provides a computer apparatus, including a memory, a processor, and a computer program stored in the memory and run in the processor, the processor executes the program to implement any one of the Hive table scanning methods provided by the present disclosure.

In a fourth aspect, the present disclosure also provides a storage medium, wherein the storage medium stores a computer program, and the computer program includes program instructions, and when the program instructions are executed by a processor, the processor is caused to perform any one of the Hive table scanning methods provided by the present disclosure.

The embodiments of the present disclosure acquires update time information of the Hive table, wherein the update time information includes an update cycle of the Hive table; determines an update cycle level corresponding to the update cycle according to a preset correspondence rule; determines a target scanning rule corresponding to the update cycle according to a preset correspondence table between the update cycle level and a preset scanning rule; and performs scan statistics to the Hive table according to the target scanning rule. The method considers the update cycle of the Hive, and determines to use different preset scanning rules as the target scanning rule to perform scan statistics according to different update cycles, thereby improving the scan statistics efficiency of the Hive table, thereby saving a lot of time for the user.

BRIEF DESCRIPTION OF THE DRAWINGS

In order to more clearly illustrate the technical solutions of the embodiments of the present disclosure, the drawings needed to be used in the description of the embodiments will be briefly described below, and obviously, the drawings in the following description are some embodiments of the present disclosure, and for person skilled in the art, other drawings could be obtained according to these drawings without any creative work.

DESCRIPTION OF THE EMBODIMENTS

The technical solutions in the embodiments of the present disclosure are clearly and completely described in the following with reference to the accompanying drawings in the embodiments of the present disclosure, obviously, the described embodiments are a part of the embodiments of the present disclosure, and not all of the embodiments. All other embodiments obtained by person skilled in the art based on the embodiments of the present disclosure without creative work fall into the protection scope of the present disclosure.

It should be understood that, when used in the present description and the appended claims, the terms "comprising" and "including" refer to the presence of described features, integers, steps, operations, elements, and/or components, but don't exclude the presence or addition of one or more of other features, integers, steps, operations, elements, components, and/or collections thereof.

It should be also understood that, the terms used herein in the description of the present disclosure is for the purpose of describing particular embodiments and is not intended to limit the present disclosure. As used in the description of the present disclosure and the appended claims, a singular form of "a", "one" and "the" are meant to include the plural form unless the context clearly indicates other situations.

It should be further understood that, the term "and/or" used in the description of the present disclosure and the appended claims means any combination and all possible combinations of one or more of the associated listed items, and includes these combinations.

Figure 1:
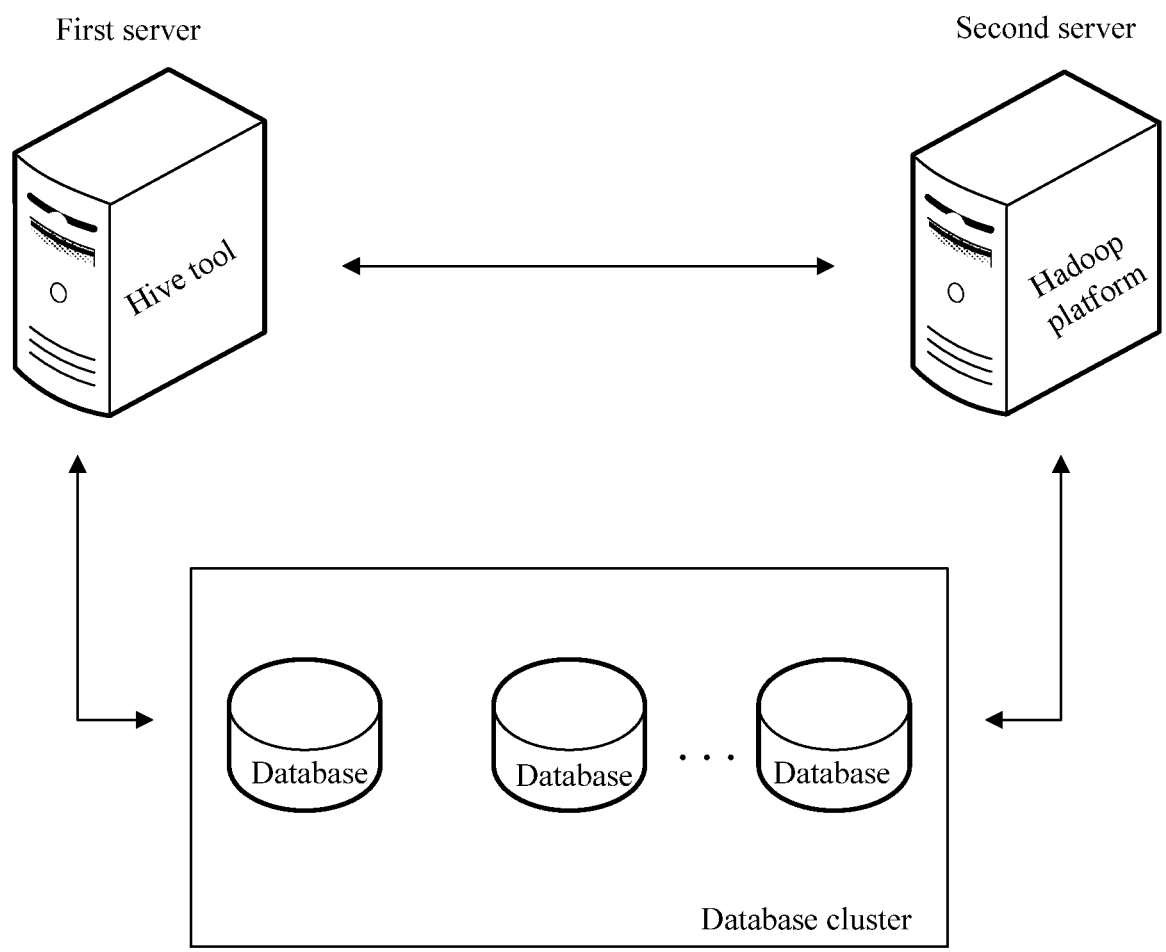
FIG. 1 is a schematic diagram of an application scenario of a Hive table scanning method provided by embodiments of the present application.

The present disclosure provides a Hive table scanning method, device, computer apparatus and storage medium. To facilitate understanding, firstly introduce the application scenario corresponding to the Hive table scanning method. Please refer to FIG. 1, and FIG. 1 is a schematic diagram of an application scenario of a Hive table scanning method provided by embodiments of the present disclosure. As shown in FIG. 1, the application scenario includes a first server, a second server, and a database cluster, wherein the first server and the second server may be independent servers or a server cluster composed of multiple servers.

Wherein, a Hive tool is installed in the first server, and a Hadoop platform is installed in the second server. The Hive tool is a data warehouse tool based on the Hadoop platform, and by means of Hadoop receipt, the Hive tool could map structured data files into a database table, which is Hive table, and provide simple SQL query function, realizing storage and management for big data in database. The scanning method and device in the following embodiments will be described based on the application scenario.

Figure 2:
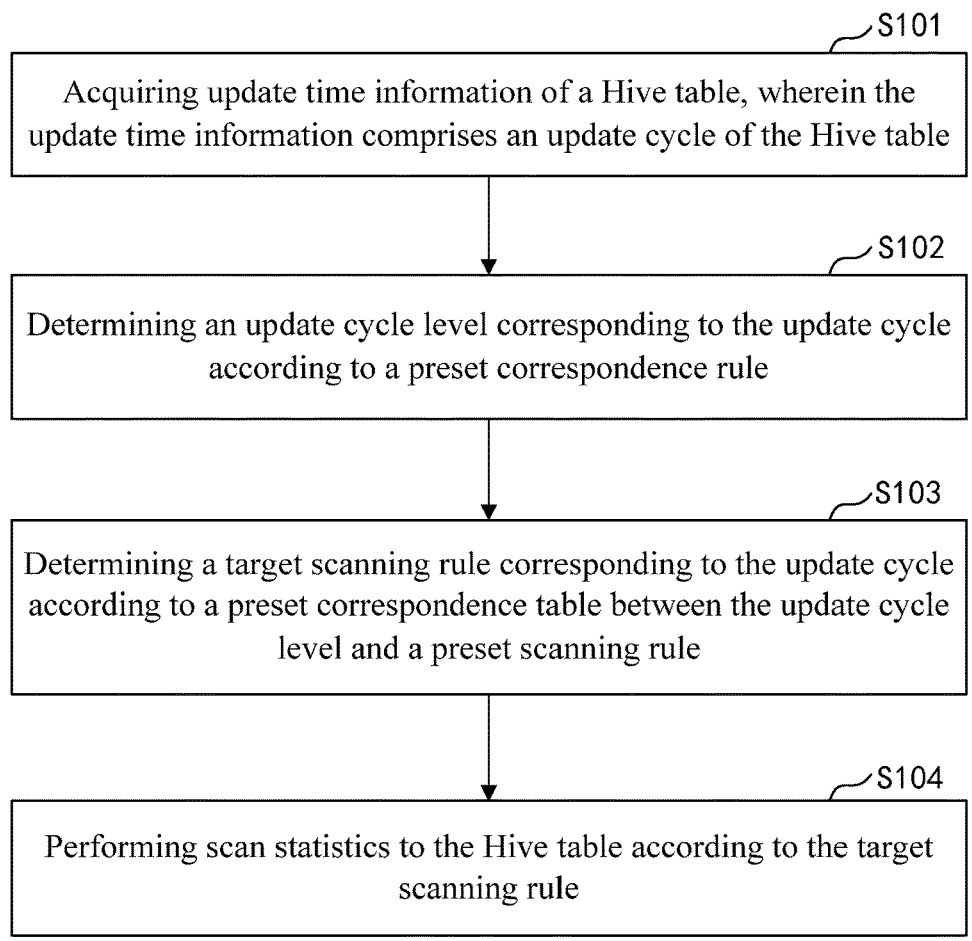
FIG. 2 is a schematic flow chart of a Hive table scanning method provided by an embodiment of the present disclosure.

Please refer to FIG. 2, and FIG. 2 is a schematic flow chart of a Hive table scanning method provided by an embodiment of the present disclosure. Specifically, as shown in FIG. 2, the scanning method includes steps S101~S104.

S101, acquiring update time information of a Hive table, wherein the update time information includes an update cycle of the Hive table.

Wherein, the update time information of the Hive table refers to the time information related to the update of the Hive table, such as the update cycle of the Hive table and the update duration corresponding to each update, etc.

In the present embodiment, the update time information includes the update cycle of the Hive table. For example, if the Hive table is updated once a day, the corresponding update cycle is 1 day; if the Hive table is updated every three days, the corresponding update cycle is 3 days.

Wherein, Hive is a data warehouse platform tool based on Hadoop, which could map structured data files into a database table, that's, Hive table, which supports SQL-like structured query function. The original intention of developing Hive is to make those who are familiar with SQL programming method better use Hadoop, and Hive allows data analysts to only focus on specific business models without needing to deeply understand the programming details of MapReduce, relying on HDFS to store data and relying on MapReduce to process and manage data. With the increase of the amount of data, the magnitude order of rows of the Hive table also increases, for example, a Hive table with ten thousand dimensions may include a magnitude order of one billion rows, therefore, the Hive table has different update cycles and update durations.

S102, determining an update cycle level corresponding to the update cycle according to a preset correspondence rule.

In the present embodiment, the update cycle level may be divided into an update cycle level I, an update cycle level II, and an update cycle level III, etc. Of course, it could be divided into other levels, which are not limited here.

Wherein, the preset correspondence rule is a preset correspondence between an update cycle of Hive table and an update cycle level, for example, the update cycle of 1 to 3 days is corresponding to the update cycle level I, and the update cycle of 3 days to 6 days is corresponding to the update cycle level II, and the update cycle of 6 days or more is corresponding to the update cycle level III.

Therefore, the update cycle level corresponding to the update cycle may be determined according to the preset correspondence rule. For example, if the acquired update cycle of the Hive table is 3 days, the update cycle level may be determined to be level I according to the preset correspondence rule.

S103, determining a target scanning rule corresponding to the update cycle according to a preset correspondence table between the update cycle level and a preset scanning rule.

In the present embodiment, the preset correspondence table is a relationship table in which different update cycle levels are corresponding to different preset scanning rules, and the preset correspondence table is preset. For example, for the update cycle level I, the update cycle level II, and the update cycle level III, etc., the corresponding preset scanning rules include a preset scanning rule a, a preset scanning rule b, and a preset scanning rule c, and the preset correspondence table may be denoted by the update cycle level and the preset scanning rule in Table 1.

| Table 1 is the preset correspondence table | | |
| --- | --- | --- |
| No. | Update cycle level | Preset scanning rule |
| 1 | Update cycle level I | Preset scanning rule a |
| 2 | Update cycle level II | Preset scanning rule b |
| 3 | Update cycle level III | Preset scanning rule c |

Wherein, the scanning modes corresponding to the preset scanning rule a, the preset scanning rule b, and the preset scanning rule are different, for example, the preset scanning rule a is a batch scanning mode and the preset scanning rule b and the preset scanning rule c is scanning for one-time, etc.; or the preset scanning rule a, the preset scanning rule b, and the preset scanning rule c are all batch scanning modes, but the number of rows scanned each time is different, for example, the scanning rule a is a batch scanning and scans 20,000 rows each time, and the preset scanning rule b is a batch scanning and scans 20,000 rows each time.

For example, the preset scanning rule a specifically scans 20,000 rows per day, and the preset scanning rule b specifically scans 80,000 rows per day, and the preset scanning rule c scans all for one-time. Because the update cycle corresponding to the update cycle level I is shorter, the content of the Hive table changes less, so it could be scanned by the way of scanning lesser per day; the update cycle of the update cycle level III is longer, so the content changes greater, so it could be scanned by the way of scanning all for one-time.

Specifically, the preset correspondence table is used to determine the target scanning rule corresponding to the update cycle of the Hive table. For example, the update cycle of the Hive table is corresponding to the update cycle level I, and then according to the preset correspondence table, determine the target scanning rule corresponding to the update cycle level I is the preset scanning rule a.

S104, performing scan statistics to the Hive table according to the target scanning rule.

In the present embodiment, for example, in the above step, it is determined that the preset scanning rule a is the target scanning rule, so perform the scan statistics to the Hive table according to the specific scanning mode corresponding to the preset scanning rule a. Because the update cycle of the Hive table is different, and the change of the field content in the Hive table is different, therefore, the scanning method determines to use different preset scanning rules to perform scanning according to the update cycle, and compared with the existing method of only using the way of scanning all for one-time, the scanning method could improve the scanning efficiency.

Figure 3:
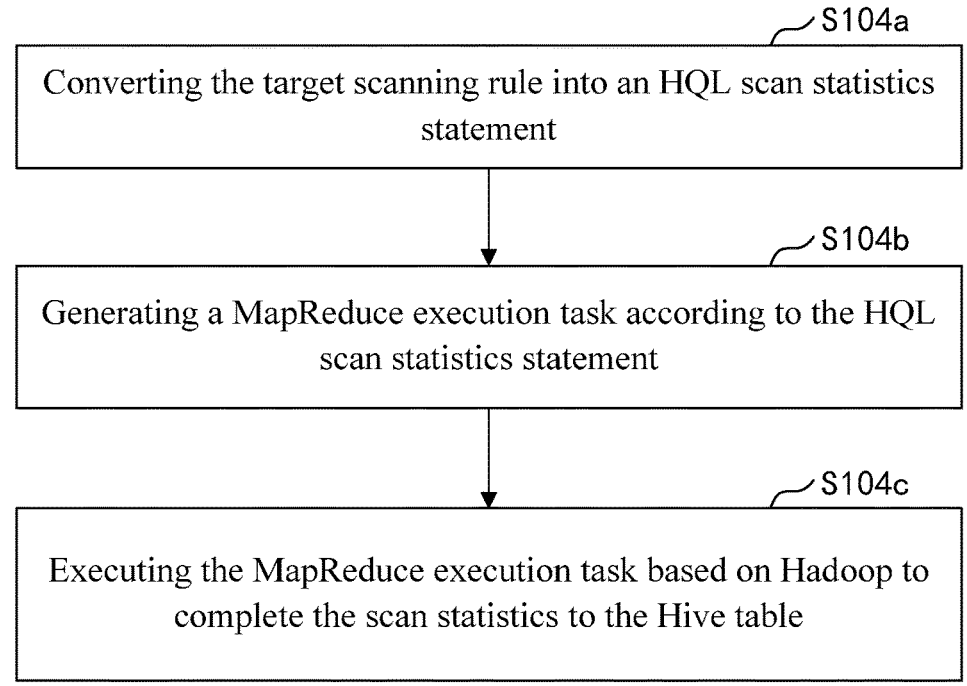
FIG. 3 is a schematic flow chart of sub-steps of the Hive table scanning method of FIG. 1.

Specifically, since Hive uses the Hadoop platform to manage a large amount of data in the database, specifically as the application scenario shown in FIG. 1. Therefore, performing scan statistics to the Hive table according to the target scanning rule, include sub-steps S104a to S104c, as shown in FIG. 3.

S104a, converting the target scanning rule into an HQL scan statistics statement; S104b, generating a MapReduce execution task according to the HQL scan statistics statement; S104c, executing the MapReduce execution task based on Hadoop to complete the scan statistics to the Hive table.

Specifically, since Hive is a data warehouse built on Hadoop, need to convert the target scanning rule into an HQL scan statistics statement, and send the HQL scan statistics statement to the Hadoop platform, and the Hadoop platform generates a MapReduce execution task according to the HQL scan statistics statement, then the Hadoop performs scan statistics to the database according to the MapReduce execution task to complete the scan statistics to the Hive table.

The above embodiment acquires update time information of the Hive table, wherein the update time information includes an update cycle of the Hive table; determines an update cycle level corresponding to the update cycle according to a preset correspondence rule; determines a target scanning rule corresponding to the update cycle according to a preset correspondence table between the update cycle level and a preset scanning rule; and performs scan statistics to the Hive table according to the target scanning rule. The method considers the update cycle of the Hive, and determines to use different preset scanning rules as the target scanning rule to perform scan statistics according to different update cycles, thereby improving the scan statistics efficiency of the Hive table, thereby saving a lot of time for the user.

Figure 4:
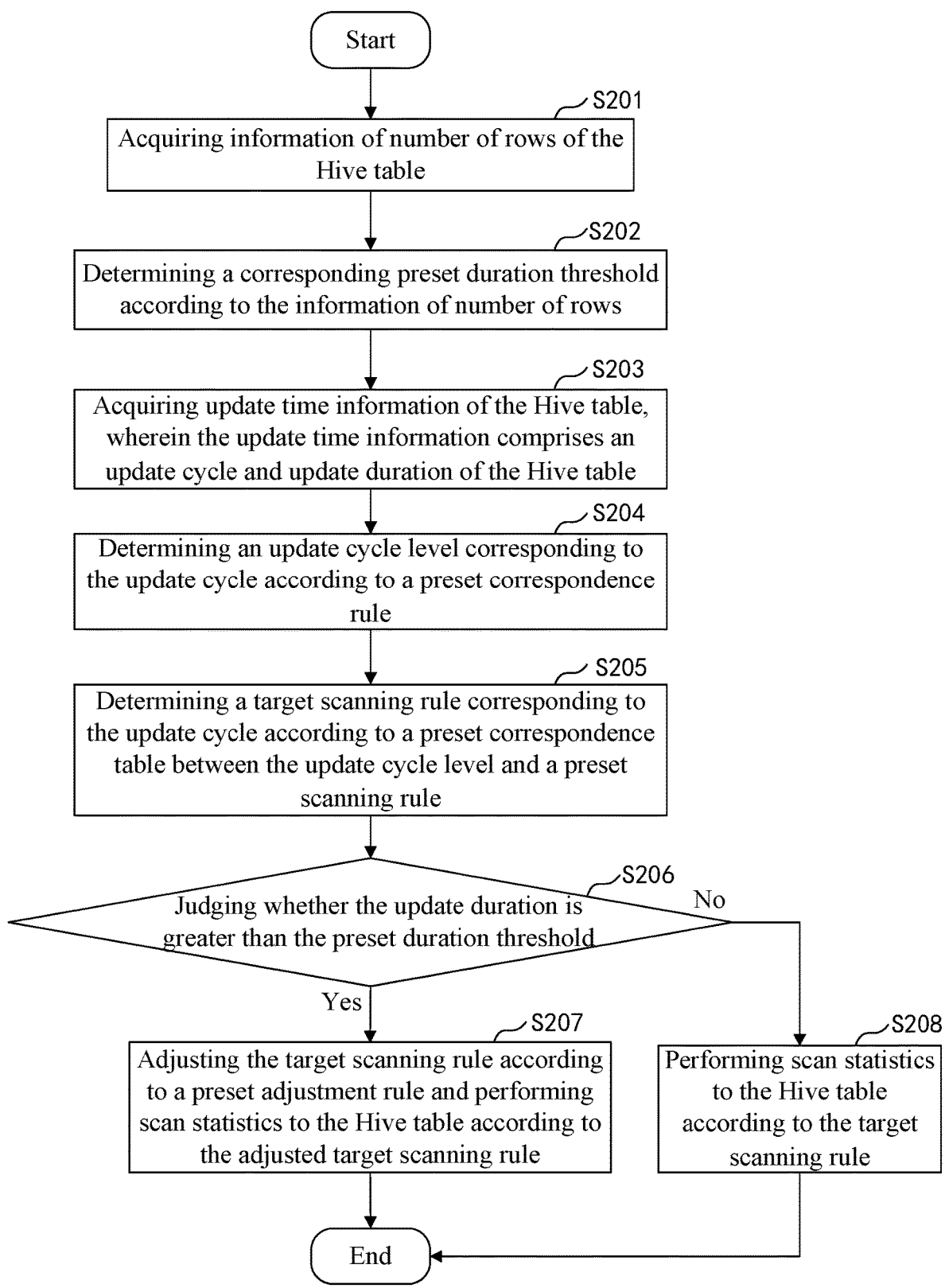
FIG. 4 is a schematic flow chart of a Hive table scanning method provided by another embodiment of the present disclosure.

Please refer to FIG. 4, and FIG. 4 is a schematic flow chart of a Hive table scanning method provided by another embodiment of the present disclosure. The scanning method can be run in a server, and the server could be an independent server or a server cluster composed of multiple servers. As shown in FIG. 4, the scanning method includes steps S201~S208.

S201, acquiring information of number of rows of the Hive table.

In the present embodiment, the information of number of rows of the Hive table refers to how many rows of data the Hive includes, for example, the Hive table includes 100 million rows of data or 1 billion rows of data, and the 100 million rows and 1 billion rows are the information of number of rows of the Hive table.

S202, determining a corresponding preset duration threshold according to the information of number of rows.

In the present embodiment, for the same host configuration, different information of number of rows needs different scanning time, therefore scanning Hive tables with different information of number of rows is also corresponding to different preset duration thresholds. The preset duration threshold could be set according to the historical scanning record, for example, the historical scanning statistics shows that it takes 1 day to scan 100 million rows, and then the preset duration threshold could be set as 1 day duration.

S203, acquiring update time information of the Hive table, wherein the update time information includes an update cycle and update duration of the Hive table.

In the present embodiment, the update time information of the Hive table refers to time information related to the update of the Hive table. For example, if the Hive table is updated once a day, the corresponding update cycle is 1 day; if the Hive table is updated every three days, the corresponding update cycle is 3 days. The update duration is the time spent on each update, for example, it takes 20 hours to scan one time, and the 20 hours is the update duration.

S204, determining an update cycle level corresponding to the update cycle according to a preset correspondence rule.

In the present embodiment, the update cycle level may be divided into an update cycle level I, an update cycle level II, and an update cycle level III, etc. Of course, it could be divided into other levels, which are not limited here.

Wherein, the preset correspondence rule is a preset correspondence between the update cycle of the Hive table and the update cycle level, for example, the update cycle of 1 to 3 days is corresponding to the update cycle level I, and the update cycle of 3 days to 6 days is the update cycle level II and the update cycle of 6 days or more is corresponding to the update cycle level III.

Therefore, determine the update cycle level corresponding to the update cycle according to the preset correspondence rule. For example, if the acquired update cycle of the Hive table is 3 days, determine the update cycle level is level I according to the preset correspondence rule.

S205, determining a target scanning rule corresponding to the update cycle according to a preset correspondence table between the update cycle level and a preset scanning rule.

In the present embodiment, the preset correspondence table is a relationship table in which different update cycle levels are corresponding to different preset scanning rules, and the preset correspondence table is preset. For example, for the update cycle level I, the update cycle level II, and the update cycle level III, etc., the corresponding preset scanning rules include a preset scanning rule a, a preset scanning rule b, and a preset scanning rule c. The preset correspondence table records one-to-one correspondence between three preset scanning rules and three update cycle levels.

Specifically, the preset correspondence table is used to determine a target scanning rule corresponding to the update cycle of the Hive table. For example, the update cycle of the Hive table is corresponding to the update cycle level I, and then determine the target scanning rule corresponding to the update cycle level I is the preset scanning rule a according to the preset correspondence table.

S206, judging whether the update duration is greater than the preset duration threshold.

In the present embodiment, determine whether the update duration is greater than the preset duration threshold, and two determination results will be generated; if the update duration is greater than the preset duration threshold, perform step S207; if the update duration is not greater than the preset duration threshold, perform step S208.

S207, adjusting the target scanning rule according to a preset adjustment rule, and performing scan statistics to the Hive table according to the adjusted target scanning rule.

In the present embodiment, if the update duration of the Hive is greater than the preset duration threshold, it indicates that a large amount of data may be generated recently, so the update content is increased, thereby causing the update duration is greater, which generates a large amount of data to be statistically managed, inevitably causing the change of the number of rows and the change of the field content of the Hive table are great, therefore, the method cannot just consider the update cycle of the Hive table, and also need to adjust the target scanning rule.

Specifically, adjusting the target scanning rule according to a preset adjustment rule, includes: replacing the preset scanning rule, for example, replacing from the preset scanning rule a to the preset scanning rule b, specifically, the preset scanning rule a scans two batches per day and scans 20,000 rows per batch, and the preset scanning rule b scans three batches per day and scans 30,000 rows per batch, and because the update duration is greater and the content is more, the scanning rule needs to be replaced from the preset scanning rule a to the preset rule b, so as to quickly complete the scan; or directly adjusting the preset scanning rule, for example, adjust the scanning mode of the preset scanning rule a, increasing the number of rows per batch, such as increasing from scanning 20000 rows per batch to scanning 30,000 rows per batch.

S208, performing scan statistics to the Hive table according to the target scanning rule.

In the present embodiment, for example, in the above step, it is determined that the preset scanning rule a is the target scanning rule, and then perform the scan statistics to the Hive table according to the specific scanning mode corresponding to the preset scanning rule a.

Besides, in order to facilitate scan statistics, and improve the scan statistics efficiency. Before performing the Hive table scanning method, the method further includes: acquiring data to be loaded that needs to be loaded into the Hive table; processing the data to be loaded by a preset processing rule, and loading the processed data to be loaded into the Hive table.

Wherein, the data to be loaded may be all network data generated on the property insurance system platform, such as customer behavior data, login information data, customer purchase behavior data or questionnaire data, and offline data, and these data is stored in database. In order to conveniently and quickly manage these data, it needs to use Hadoop and Hive tool to manage, and the Hive tool loads the data to be loaded into the Hive table by means of Hadoop. Before loading, the data to be loaded needs to be processed, and specifically use a preset processing rule to process the data to be loaded, for example, compress the data to be loaded to improve the loading efficiency and facilitate future scan statistics. Of course, the process may further include redundantly processing the data to be loaded, etc., which are not described in detail herein.

Specifically, the compression includes compressing the data to be loaded by a preset compression algorithm, wherein the preset compression algorithm includes: a bit-filling compression algorithm Bit Packing Compression, a dictionary compression algorithm Dictionary Compression, and a run length compression algorithm Run Length Compression, and a variable incremental compression algorithm Delta Compression, and a combination algorithm generated by these algorithms.

The above embodiment, acquire update time information of the Hive table, wherein the update time information includes an update cycle and update duration of the Hive table; determine an update cycle level corresponding to the update cycle according to a preset correspondence rule; determine a target scanning rule corresponding to the update cycle according to a preset correspondence table between the update cycle level and a preset scanning rule; adjust the target scanning rule according to a preset adjustment rule, and perform scan statistics to the Hive table according to the adjusted target scanning rule, if the update duration is greater than the preset duration threshold; or, perform scan statistics to the Hive table according to the target scanning rule, if the update duration is not greater than the preset duration threshold. The method considers the update cycle and the update duration of the Hive, thereby further improves the scan statistics efficiency of the Hive table, thereby saves a lot of time for the user.

Figure 5:
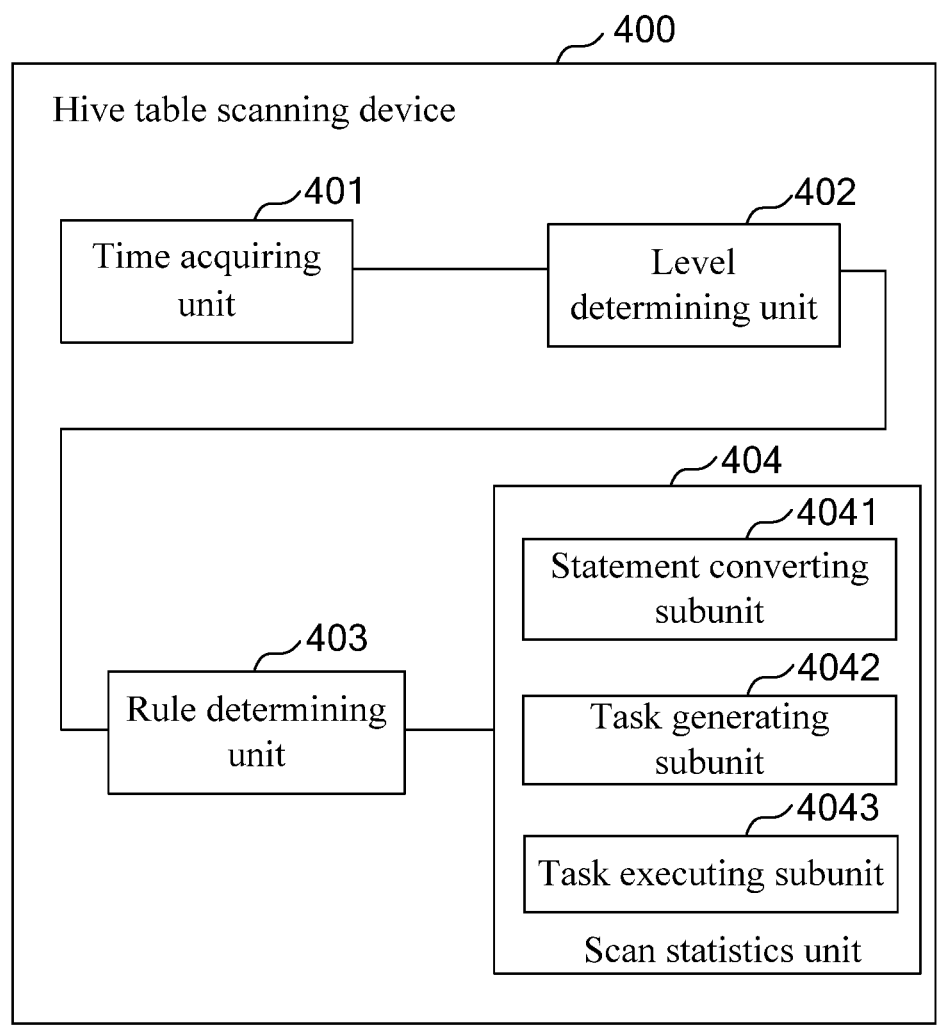
FIG. 5 is a schematic block diagram of a Hive table scanning device provided by an embodiment of the present disclosure.

Please refer to FIG. 5, and FIG. 5 is a schematic block diagram of a Hive table scanning device provided by an embodiment of the present disclosure. The Hive table scanning device 400 could be installed in a server. As shown in FIG. 5, the Hive table scanning device 400 includes: a time acquiring unit 401, a level determining unit 402, a rule determining unit 403, and a scan statistics unit 404.

The time acquiring unit 401 is for acquiring update time information of the Hive table, wherein the update time information includes an update cycle of the Hive table.

The level determining unit 402 is for determining an update cycle level corresponding to the update cycle according to a preset correspondence rule.

The rule determining unit 403 is for determining a target scanning rule corresponding to the update cycle according to a preset correspondence table between the update cycle level and a preset scanning rule.

The scan statistics unit 404 is for performing scan statistics to the Hive table according to the target scanning rule.

Wherein, the scan statistics unit 404 includes: a statement converting subunit 4041, a task generating subunit 4042, and a task executing subunit 4043.

Specifically, the statement converting subunit 4041, is for converting the target scanning rule into an HQL scan statistics statement; the task generating subunit 4042, is for generating a MapReduce execution task according to the HQL scan statistics statement; the task executing subunit 4043, is for executing the MapReduce execution task based on Hadoop to complete the scan statistics to the Hive table.

Figure 6:
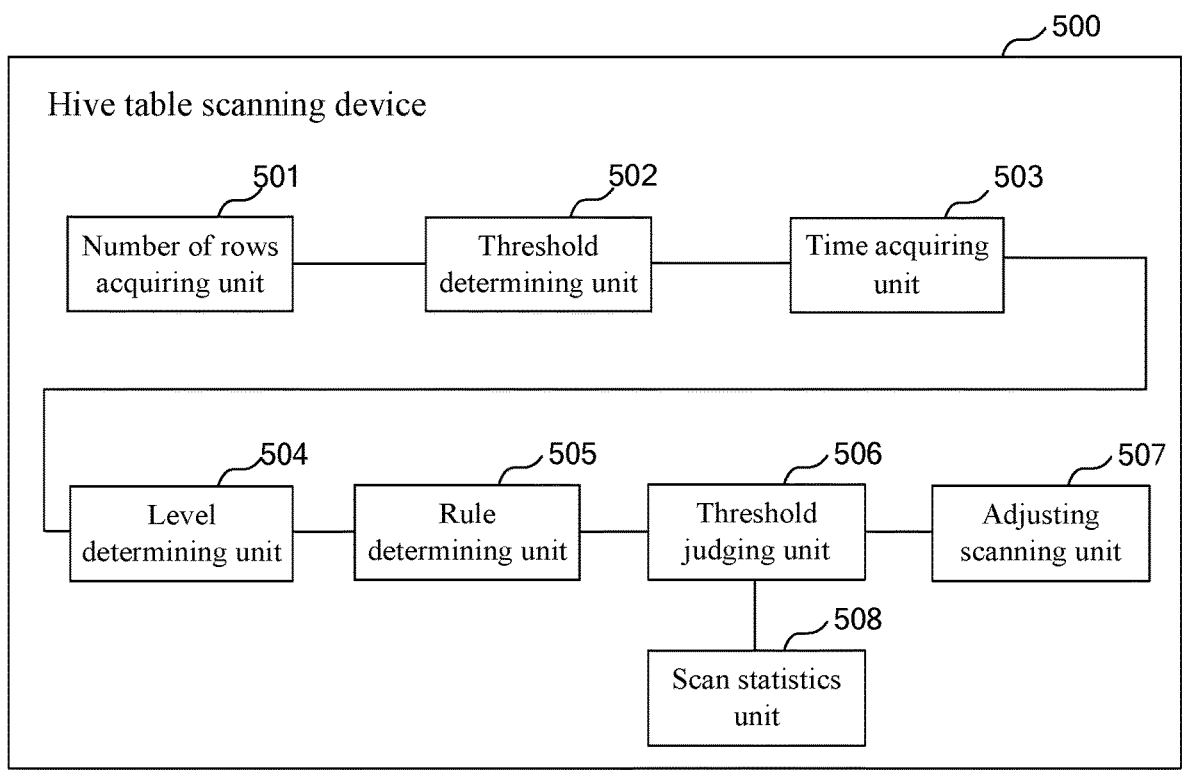
FIG. 6 is a schematic block diagram of a Hive table scanning device provided by another embodiment of the present disclosure.

Please refer to FIG. 6, and FIG. 6 is a schematic block diagram of a Hive table scanning device provided by an embodiment of the present disclosure. The Hive table scanning device 500 could be installed in a server. As shown in FIG. 6, the Hive table scanning device 500 includes: a number of rows acquiring unit 501, a threshold determining unit 502, a time acquiring unit 503, a level determining unit 504, a rule determining unit 505, a threshold judging unit 506, an adjusting scanning unit 507, and a scan statistics unit 508.

The number of rows acquiring unit 501, is for acquiring information of number of rows of the Hive table.

The threshold determining unit 502, is for determining a corresponding preset duration threshold according to the information of number of rows.

The time acquiring unit 503, is for acquiring update time information of the Hive table, wherein the update time information includes an update cycle and update duration of the Hive table.

The level determining unit 504, is for determining an update cycle level corresponding to the update cycle according to a preset correspondence rule.

The rule determining unit 505, is for determining a target scanning rule corresponding to the update cycle according to a preset correspondence table between the update cycle level and a preset scanning rule.

The threshold judging unit 506, is for judging whether the update duration is greater than the preset duration threshold.

The adjusting scanning unit 507, is for adjusting the target scanning rule according to a preset adjustment rule, and performing scan statistics to the Hive table according to the adjusted target scanning rule, if the update duration is greater than the preset duration threshold.

The scan statistics unit 508, is for performing scan statistics to the Hive table according to the target scanning rule, if the update duration is not greater than the preset duration threshold.

Person skilled in the art could clearly understand that, for the convenience and brevity of the description, the specific working process of the Hive table scanning device and the unit described above could refer to the corresponding process in the foregoing embodiments of method, which are not described herein again.

In the several embodiments provided by the present disclosure, it should be understood that, the disclosed Hive table scanning device and method may be implemented in other manners. For example, the embodiments of the Hive table scanning device described above are merely illustrative. For example, the division of each unit is only a logical function division, and there may be other division manners in actual implementation. For example, multiple units or components may be combined or integrated into another system, or some features may be omitted or not executed.

Figure 7:
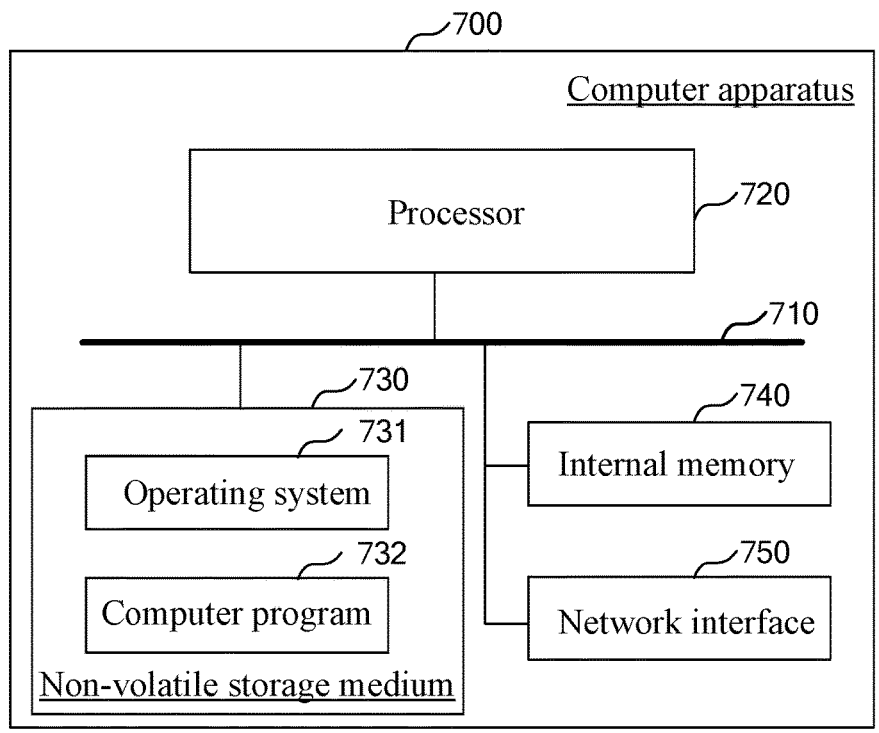
FIG. 7 a schematic block diagram of a computer apparatus provided by an embodiment of the present disclosure.

The above Hive table scanning device could be implemented in a form of a computer program, and the computer program could be run on a computer apparatus as shown in FIG. 7.

Please refer to FIG. 7, and FIG. 7 is a schematic block diagram of a computer apparatus provided by an embodiment of the present disclosure. The computer apparatus 700 may be a terminal or a server.

Referring to FIG. 7, the computer apparatus 700 includes a processor 720, a memory, and a network interface 750 connected by a system bus 710, wherein, the memory could include a non-volatile storage medium 730 and an internal memory 740.

The non-volatile storage medium 730 could store an operating system 731 and a computer program 732. When the computer program 732 is executed, the processor 720 could be caused to perform any one of the Hive table scanning methods.

The processor 720 is used to provide computing and control capabilities, to support the operation of the entire computer apparatus 700.

The internal memory 740 provides an environment for operation of the computer program in a non-volatile storage medium, and when the computer program is executed by the processor 720, the processor 720 could be caused to perform any one of the Hive table scanning methods.

The network interface 750 is used for network communication, such as sending assigned tasks and the like. Person skilled in the art could understand that, the structure shown in FIG. 7 is only a block diagram of a part of the structure related to the solution of the present disclosure, and does not constitute a limitation of the computer apparatus 700 to which the solution of the present disclosure is applied, and a specific computer apparatus 700 may include more or fewer components than those shown in the figure, or combine some components, or have a different arrangement for the components.

Wherein, the processor 720 is for running program code stored in the memory, to implement the following steps: acquiring update time information of a Hive table, wherein the update time information includes an update cycle of the Hive table; determining an update cycle level corresponding to the update cycle according to a preset correspondence rule; determining a target scanning rule corresponding to the update cycle according to a preset correspondence table between the update cycle level and a preset scanning rule; and performing scan statistics to the Hive table according to the target scanning rule.

In an embodiment, before performing acquiring update time information of the Hive table, the processor 720 further performs the following steps: acquiring data to be loaded that needs to be loaded into the Hive table; and processing the data to be loaded by a preset processing rule.

In an embodiment, when the processor 720 processes processing the data to be loaded by a preset processing rule, the processor 720 specifically performs the following step: compressing the data to be loaded.

In another embodiment, the processor 720 is for running program code stored in the memory, to implement the following steps: acquiring information of number of rows of the Hive table; and determining a corresponding preset duration threshold according to the information of number of rows; acquiring update time information of the Hive table, wherein the update time information includes an update cycle of the Hive table; determining an update cycle level corresponding to the update cycle according to a preset correspondence rule; determining a target scanning rule corresponding to the update cycle according to a preset correspondence table between the update cycle level and a preset scanning rule; judging whether the update duration is greater than the preset duration threshold; adjusting the target scanning rule according to a preset adjustment rule, and performing scan statistics to the Hive table according to the adjusted target scanning rule, if the update duration is greater than the preset duration threshold; and performing scan statistics to the Hive table according to the target scanning rule, if the update duration is not greater than the preset duration threshold.

It should be understood that, in the embodiment of the present disclosure, the processor 720 may be a central processing unit (Central Processing Unit, CPU), and the processor 720 may also be other general-purpose processor, digital signal processor (Digital Signal Processor, DSP), and application specific integrated circuit (Application Specific Integrated Circuit, ASIC), field-programmable gate array (Field-Programmable Gate Array, FPGA) or other programmable logic device, discrete gate or transistor logic device, discrete hardware component, etc. wherein, the general-purpose processor may be a microprocessor or the processor may be any conventional processor and so on.

Person skilled in the art could understand that, the structure of the computer apparatus 700 shown in FIG. 7 does not constitute a limitation to computer apparatus 700, may include more or fewer components than those shown in the figure, or combine some components, or have a different arrangement for the components.

Person skilled in the art could understand that all or part of the processes in the method of the above embodiments may be implemented by a computer program to instruct related hardware, and the program may be stored in a storage medium, and the storage medium is a computer-readable storage medium. In an embodiment of the present disclosure, the program may be stored in a storage medium of a computer system and executed by at least one processor of the computer system, to implement the process steps of the embodiments including the above methods.

The computer-readable storage medium may be a medium that can store program code, such as a magnetic disk, an optical disk, a USB flash drive, a mobile hard disk, a random access memory (Random Access Memory, RAM), a magnetic disk, or an optical disk.

Person skilled in the art may realize that, the units and algorithm steps of the various examples described in the embodiments disclosed herein could be implemented by electronic hardware, computer software, or a combination of both, in order to clearly describe interchangeability of hardware and software, the above description has generally described the composition and steps of the various examples according to function. Whether these functions are performed by the manner of hardware or software depends on the specific application and design constraints of technical solution. Person skilled in the art could use different methods to implement the described functions for each particular application, but such implementation should not be considered to be beyond the scope of the present disclosure.

The steps in the method of the embodiments of the present disclosure may be sequentially adjusted, combined, and deleted according to actual needs.

The units in the device of the embodiments of the present disclosure may be combined, divided, and deleted according to actual needs.

Besides, each functional unit in each embodiment of the present disclosure may be integrated into one processing unit, or each unit may separately physically exist, or two or more units may be integrated into one unit. The above integrated unit may be implemented in the form of hardware or in the form of a software functional unit.

The integrated unit, if implemented in the form of a software functional unit and sold or used as an independent product, could be stored in a computer-readable storage medium. Based on such understanding, the essential part or the part contributing to the prior art in the technical solution of the present disclosure, or all or part of the technical solution may be embodied in the form of a software product, and the software product is stored in a storage medium, including some instructions for causing a computer apparatus (may be a personal computer, terminal, or network device, etc.) to perform all or part of the steps of the methods described in various embodiments of the present disclosure.

The above description is only specific embodiments of the present disclosure, but the protection scope of the present disclosure is not limited thereto, and any person skilled in the art could easily conceive various equivalent modifications or alternatives within the technical scope disclosed by the present disclosure, and these modifications or alternatives should all fall into the protection scope of the present disclosure. Therefore, the protection scope of the present disclosure should be subject to the protection scope of the claims.

What is claimed is:

1. A Hive table scanning method, comprising:
   acquiring update time information of a Hive table, wherein the update time information comprises an update cycle of the Hive table;
   determining an update cycle level corresponding to the update cycle according to a preset correspondence rule;
   determining a target scanning rule corresponding to the update cycle according to a preset correspondence table between the update cycle level and a preset scanning rule; and
   performing scan statistics to the Hive table according to the target scanning rule.

2. The Hive table scanning method according to claim 1, wherein, the update time information further comprises update duration of the Hive table;
   before the step of acquiring update time information of a Hive table, the method further comprises:
   acquiring information of number of rows of the Hive table; and
   determining a corresponding preset duration threshold according to the information of number of rows;
   after the step of determining a target scanning rule corresponding to the update cycle according to a preset correspondence table the between the update cycle level and a preset scanning rule, the method further comprises:
   judging whether the update duration is greater than the preset duration threshold;
   adjusting the target scanning rule according to a preset adjustment rule, and performing scan statistics to the Hive table according to the adjusted target scanning rule, if the update duration is greater than the preset duration threshold.

3. The Hive table scanning method according to claim 1, wherein, before the step of acquiring update time information of a Hive table, the method further comprises:
   acquiring data to be loaded that needs to be loaded into the Hive table; and
   processing the data to be loaded by a preset processing rule.

4. The Hive table scanning method according to claim 1, wherein, the step of performing scan statistics to the Hive table according to the target scanning rule comprises:
   converting the target scanning rule into an HQL scan statistics statement;
   generating a MapReduce execution task according to the HQL scan statistics statement; and
   executing the MapReduce execution task based on Hadoop to complete the scan statistics to the Hive table.

5. The Hive table scanning method according to claim 2, wherein, after the step of judging whether the update duration is greater than the preset duration threshold, the method further comprises:
   performing scan statistics to the Hive table according to the target scanning rule, if the update duration is not greater than the preset duration threshold.

6. The Hive table scanning method according to claim 3, wherein, the step of processing the data to be loaded by a preset processing rule comprises: compressing the data to be loaded.

7. The Hive table scanning method according to claim 6, wherein, the step of compressing the data to be loaded comprises:
   compressing the data to be loaded by a preset compression algorithm, wherein the preset compression algorithm comprises: bit packing compression, dictionary compression, run length compression, and delta compression.

8. A computer apparatus, comprises a memory, a processor, and a computer program stored in the memory and run in the processor, wherein the processor executes the computer program to implement the following steps:
- acquiring update time information of a Hive table, wherein the update time information comprises an update cycle of the Hive table;
- determining an update cycle level corresponding to the update cycle according to a preset correspondence rule;
- determining a target scanning rule corresponding to the update cycle according to a preset correspondence table between the update cycle level and a preset scanning rule; and
- performing scan statistics to the Hive table according to the target scanning rule.

9. The computer apparatus according to claim 8, wherein, the update time information further comprises update duration of the Hive table; and the processor executes the computer program to implement the following steps:
- acquiring information of number of rows of the Hive table;
- determining a corresponding preset duration threshold according to the information of number of rows;
- judging whether the update duration is greater than the preset duration threshold; and
- adjusting the target scanning rule according to a preset adjustment rule, and performing scan statistics to the Hive table according to the adjusted target scanning rule, if the update duration is greater than the preset duration threshold.

10. The computer apparatus according to claim 8, wherein, the processor executes the computer program to implement the following steps:
- acquiring data to be loaded that needs to be loaded into the Hive table; and
- processing the data to be loaded by a preset processing rule.

11. The computer apparatus according to claim 8, wherein, the processor executes the computer program to implement the following steps:
- converting the target scanning rule into an HQL scan statistics statement;
- generating a MapReduce execution task according to the HQL scan statistics statement; and
- executing the MapReduce execution task based on Hadoop to complete the scan statistics to the Hive table.

12. The computer apparatus according to claim 10, wherein, the processor executes the computer program to implement the following step: compressing the data to be loaded.

13. A non-transitory storage medium, wherein, the storage medium stores a computer program, and the computer program comprises program instructions, and when the program instructions are executed by a processor, the processor is caused to perform the following steps:
- acquiring update time information of a Hive table, wherein the update time information comprises an update cycle of the Hive table;
- determining an update cycle level corresponding to the update cycle according to a preset correspondence rule;
- determining a target scanning rule corresponding to the update cycle according to a preset correspondence table between the update cycle level and a preset scanning rule; and
- performing scan statistics to the Hive table according to the target scanning rule.

14. The non-transitory storage medium according to claim 13, wherein, the update time information further comprises update duration of the Hive table; when the program instructions are executed by a processor, the processor is caused to perform the following steps:
- acquiring information of number of rows of the Hive table;
- determining a corresponding preset duration threshold according to the information of number of rows;
- judging whether the update duration is greater than the preset duration threshold; and
- adjusting the target scanning rule according to a preset adjustment rule, and performing scan statistics to the Hive table according to the adjusted target scanning rule, if the update duration is greater than the preset duration threshold.

15. The non-transitory storage medium according to claim 13, wherein, when the program instructions are executed by a processor, the processor is caused to perform the following steps: acquiring data to be loaded that needs to be loaded into the Hive table; and processing the data to be loaded by a preset processing rule.

16. The non-transitory storage medium according to claim 13, wherein, when the program instructions are executed by a processor, the processor is caused to perform the following step:
- converting the target scanning rule into an HQL scan statistics statement;
- generating a MapReduce execution task according to the HQL scan statistics statement; and
- executing the MapReduce execution task based on Hadoop to complete the scan statistics to the Hive table.

17. The non-transitory storage medium according to claim 15, wherein, when the program instructions are executed by a processor, the processor is caused to perform the following step: compressing the data to be loaded.

* * * * *